United States Patent [19]

Endo et al.

[11] Patent Number: 4,638,438

[45] Date of Patent: Jan. 20, 1987

[54] NAVIGATION APPARATUS FOR AUTOMOTIVE

[75] Inventors: Akira Endo, Mito; Jiro Takezaki, Katsuta; Fumio Tsujii, Mito; Takanori Shibata, Hitachi, all of Japan

[73] Assignee: Hitachi, Ltd., Tokyo, Japan

[21] Appl. No.: 612,856

[22] Filed: May 22, 1984

[30] Foreign Application Priority Data

May 23, 1983 [JP] Japan ................................ 58-89141

[51] Int. Cl.⁴ ..................... G06F 15/50; G09B 29/10
[52] U.S. Cl. .................................. 364/449; 364/521; 364/577; 340/995
[58] Field of Search ............... 364/424, 443, 444, 449, 364/521, 577, 723; 343/450-453; 340/988-990, 995; 73/178 R

[56] References Cited

U.S. PATENT DOCUMENTS

| | | | |
|---|---|---|---|
| 3,748,447 | 7/1973 | Hajicek et al. | 364/723 |
| 4,366,475 | 12/1982 | Kishi et al. | 364/521 |
| 4,402,012 | 8/1983 | Knight | 364/723 |
| 4,446,529 | 5/1984 | Strolle | 364/557 |
| 4,504,913 | 3/1985 | Miura et al. | 340/990 |
| 4,527,155 | 7/1985 | Yamaki et al. | 340/990 |
| 4,532,514 | 7/1985 | Hatano et al. | 340/995 |
| 4,532,602 | 7/1985 | DuVall | 364/577 |
| 4,543,572 | 9/1985 | Tanaka et al. | 340/995 |

FOREIGN PATENT DOCUMENTS 57-169785 10/1982 Japan .

*Primary Examiner*—Gary Chin
*Attorney, Agent, or Firm*—Antonelli, Terry & Wands

[57] ABSTRACT

A navigation apparatus mounted on a vehicle comprises a distance sensor sensing the travelled distance of the vehicle, a direction sensor sensing the advancing direction of the vehicle, an information storage unit storing map data, a signal processor computing the present position of the vehicle on the basis of the output signals from the distance sensor and direction sensor for displaying the computed present position of the vehicle on a color cathode-ray tube together with a map read out from the information storage unit. In the navigation apparatus, the map data are provided by position coordinate information or font information of division points dividing a road map into sections that can be linearly interpolated.

5 Claims, 10 Drawing Figures

F I G. I

NAVIGATION APPARATUS FOR AUTOMOTIVE

This invention relates to a navigation apparatus mounted on an automotive vehicle for displaying the present position of the vehicle, a road map and information including that required for the driving of the vehicle.

An automobile drive guiding apparatus sensing the present position of a vehicle for displaying the sensed present position of the vehicle on a road map together with information including that required for the driving of the vehicle is known and disclosed in, for example, Japanese Patent Application Laid-open No. 57-169785 (1982) entitled "Navigation Apparatus for Vehicle". According to the cited patent application, a mark indicating the position and advancing direction of a vehicle is displayed with a constant attitude at a predetermined position on a display screen so that the position and direction of the vehicle can be continuously displayed on the display screen with the movement of the vehicle. The apparatus disclosed in the cited patent application includes means for moving the map pattern and means for enlarging and reducing the scale of a displayed map by a plurality of predetermined factors for facilitating the recognition of the present position of the vehicle on the map.

In the known apparatus disclosed in the cited patent application, a map is displayed as an assembly of dots, and, when it is desired to display the map in an enlarged scale, corresponding data for displaying the map with dots of M rows and N columns are read out from a display screen data storage, and the dots are dispersed on the display screen for displaying an enlarged map. An excessive dispersion of the display dots for displaying the map on an excessively enlarged scale gives rise to difficulty of visual recognition of the displayed map. Therefore, the scale of enlargement or magnification is limited to such an extent that the map display provided by the dispersed display dots can be sufficiently visually recognized by the naked eyes of the vehicle driver.

In the map display by the known apparatus above described, it is supposed, for example, that the number of display dots sufficient to display a map of a reduced scale of 1/250,000 is (M×N) meaning that display dots of M rows and N columns are required for the map display. Then, when the map of the scale of 1/250,000 is enlarged to display the map on a scale of, for example, 1/50,000 or with a magnification of 5, the display dots are widely dispersed to such an extent that the map displayed by the dispersed dots is not sufficiently recognized by the driver. (This is because the area occupied by the dispersed display dots is now 5×5=25 times as large as that in the map of the scale of 1/250,000.) Therefore, in order that the map of the scale of 1/250,000 can be displayed on the enlarged scale of 1/50,000 (the magnification of 5), the enlarged map display will not be satisfactorily visually recognizable unless the storage stores such a large number of data as to ensure that the map of the enlarged scale of 1/50,000 can be displayed by display dots of 5M rows×5N columns (5M×5N display dots) which are 25 times as many as those required for displaying the original map of the scale of 1/250,000. That is, in order that the original map of the reduced scale of 1/250,000 can be displayed with the magnification of 5 or on the enlarged scale of 1/50,000, the required storage capacity is 25 times as large as that required for the display of the original map. Thus, when, for example, the desired magnification of the enlarged map is 10, the required storage capacity is 100 times as large as that required for the display of the original map. It will be seen from the above description that the prior art navigation apparatus has been defective in that a very large amount of map data must be stored to meet the requirement for the display of a map of an enlarged scale. An increase in the quantity of map data recorded on the magnetic tape leads necessarily to an extended access time for reading out map data corresponding to a displayed map and leads also to a very large amount of data to be handled by the navigation apparatus. Therefore, the prior art apparatus requiring a memory part having a large storage capacity has also had a drawback from the viewpoint of overall costs.

With a view to obviate the aforementioned defects of the prior art navigation apparatus, it is a primary object of the present invention to provide a navigation apparatus which, without excessively increasing the quantity of the recording medium and the data storage capacity of the storage, can store a sufficient amount of map information including that required for an enlarged map display in spite of a relatively small storage capacity of its memory part.

The navigation apparatus according to the present invention which attains the above object is featured by the fact that map data required for map display is recorded in the form of position coordinate information of division points dividing a road map into linearly interpolatable sections, and a map is displayed by applying linear interpolation to the train of such position information.

The present invention will be apparent from the following detailed description taken in conjunction with the accompanying drawings, in which.

A preferred embodiment of the navigation apparatus according to the present invention will be described with reference to the drawings.

Figure 1:
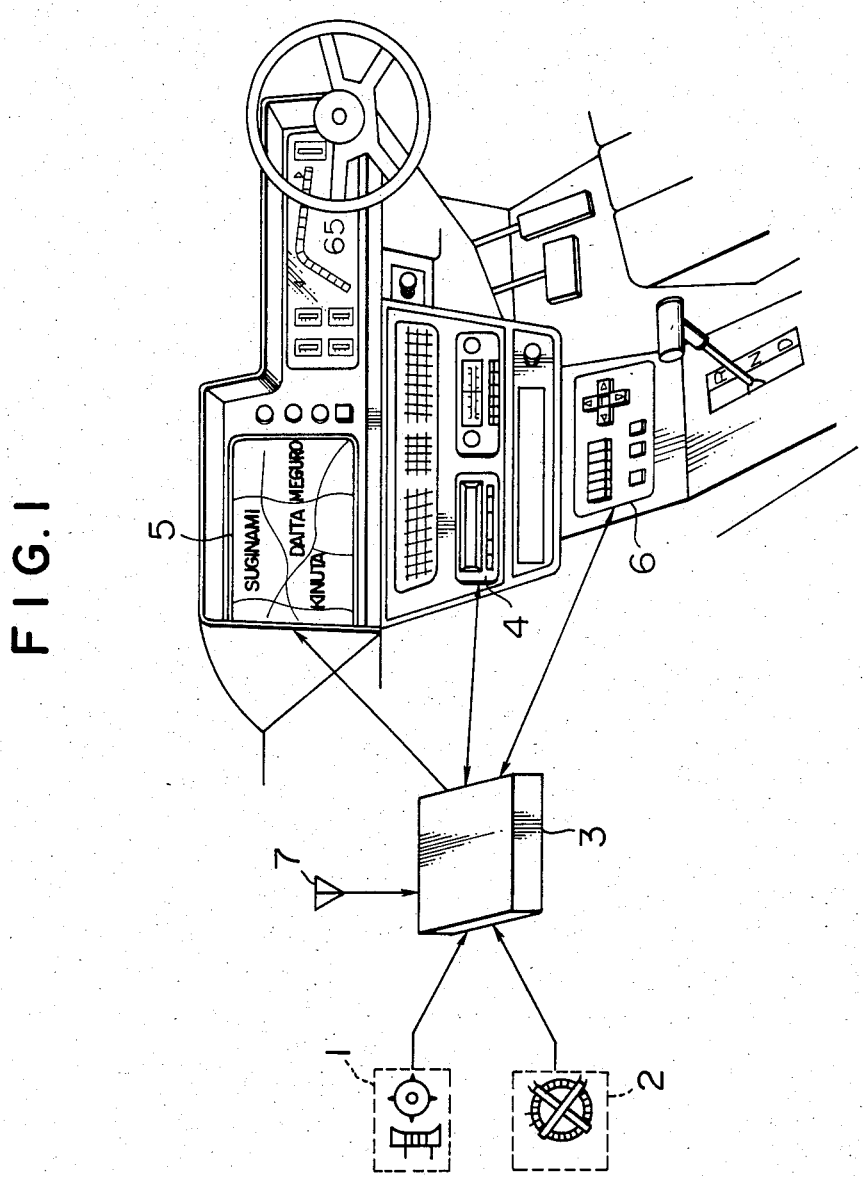
FIG. 1 is a schematic perspective view illustrating the general arrangement of parts of the navigation apparatus according to the present invention.

FIG. 1 shows the general arrangement of parts of the navigation apparatus embodying the present invention. Referring to FIG. 1, a travelled distance sensor 1 generates a pulse signal indicative of, for example, the speed of a vehicle. An advancing direction sensor 2 senses the advancing direction of the vehicle and is, for example, a magnetic sensor utilizing the terrestrial magnetism for sensing the advancing direction of the vehicle. The output signals from the travelled distance sensor 1 and advancing direction sensor 2 are applied to a signal processor 3. The signal processor 3 makes arithmetic and logic processing on these two input signals to compute the present travelling position of the vehicle. While the signal processor 3 is computing the present travelling position of the vehicle, map data corresponding to the present travelling position of the vehicle is applied to the signal processor 3 from an information storage unit 4. A cassette tape recorder is used as this information storage unit 4. However, the information storage unit 4 may be any other storage means such as a random access memory (RAM) or a magnetic disk memory. The signal processor 3 compares the information of the present travelling position of the vehicle with the corresponding map information applied from the information storage unit 4, and the map data is displayed together with the accurate present travelling position on the map on a display unit 5 including a cathode-ray tube (CRT). An input unit 6 controls the operation of the signal processor 3.

The structure of the signal processor 3 will be described in detail with reference to FIG. 2.

Figure 2:
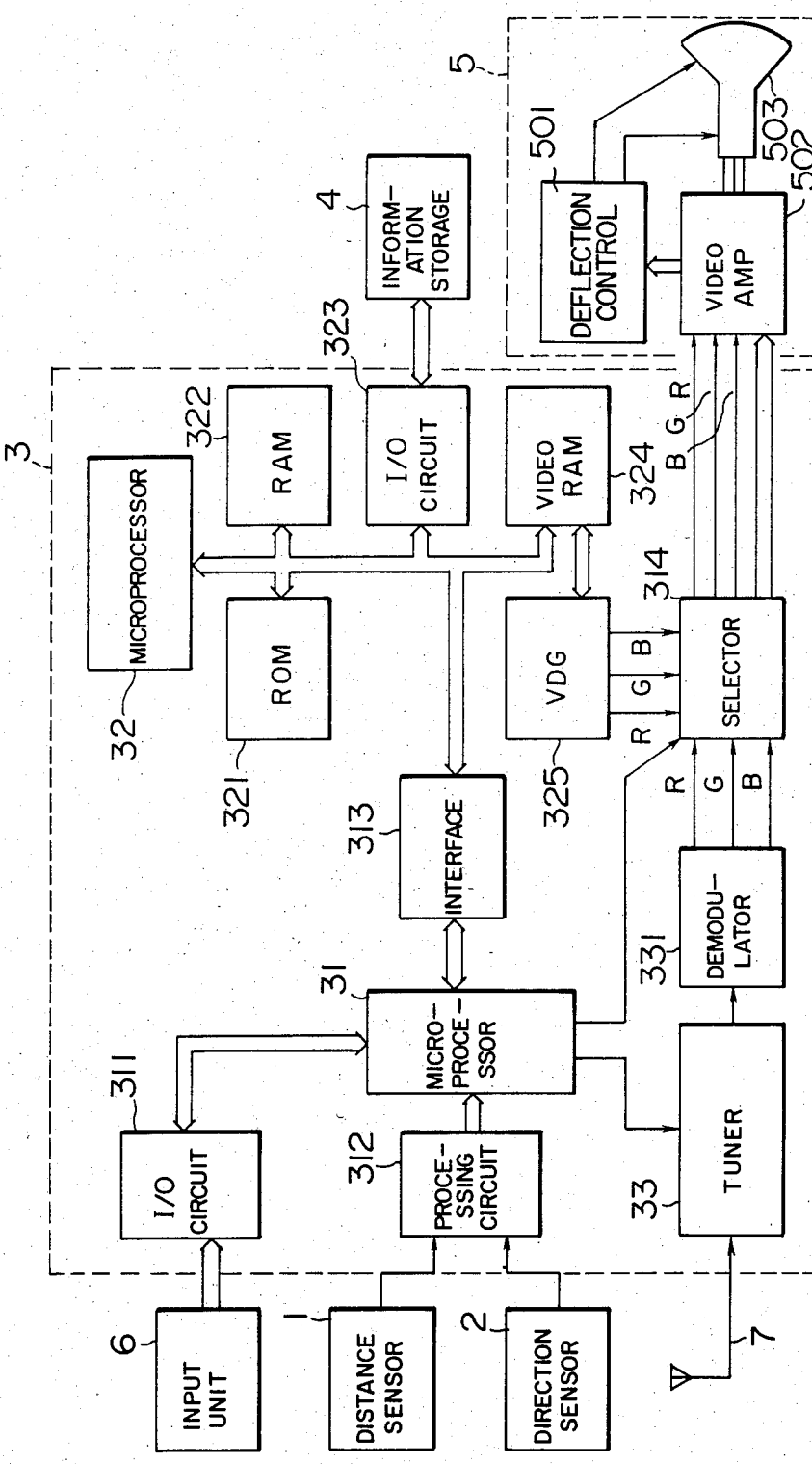
FIG. 2 is a block diagram showing the fundamental structure of a preferred embodiment of the navigation apparatus of the present invention.

Referring to FIG. 2, the output signals from the travelled distance sensor 1, advancing direction sensor 2 and input unit 6 are applied to the signal processor 3 which computes the present travelling position of the vehicle. The map data corresponding to the computed present position of the vehicle is read out from the information storage unit 4 to be displayed on the display unit 5 together with the information of the present position of the vehicle. In FIG. 2, a TV antenna 7 is additionally provided so that the display unit 5 can be also used as a television receiver.

Referring to FIG. 2 showing the structure of the signal processor 3 in detail, the signal processor 3 includes two microprocessors 31 and 32 functioning as control means. The microprocessor 31 controls the arithmetic and logic processing for computation of the present position of the vehicle and controls also the operation of the whole system. On the other hand, the microprocessor 32 controls the map data processing and controls also the map display. The output signal from the input unit 6 which may be a keyboard is applied to an input/output circuit 311. A processing circuit 312 effects waveform-shaping processing on the output signals of the travelled distance sensor 1 and advancing direction sensor 2 so that these signals can be readily arithmetically and logically processed by the microprocessor 31. An interface circuit 313 is provided to permit control of the microprocessor 32 by the microprocessor 31. The microprocessor 32 operates according to a program stored in a read-only memory (ROM) 321. A random access memory (RAM) 322 stores temporarily such data as stack memory data supplied from the microprocessor 32 and map data supplied from the information storage unit 4 through an input/output circuit 323. The input/output circuit 323 has the function of map data reproduction and edition. That is, this circuit 323 searches map data by driving the information storage unit 4, which is the cassette tape recorder herein, in its playback, fast forward or rewind mode, converts the map data serially read out from the magnetic tape in the cassette tape recorder 4 into parallel data, and stores temporarily such data. A video RAM 324 has the capacity of storing display data corresponding to a displayed map. The display data written in the video RAM 324 is displayed on the display unit 5 by a video display generator (VDG) 325 connected to the display unit 5 through a selector circuit 314. In the embodiment being described, the TV antenna 7 is connected to the display unit 5 through a TV tuner 33, a demodulator circuit 331 and the selector circuit 314 so that a TV signal can also be received and displayed when the selector circuit 314 is switched over to the TV reception mode under control of the microprocessor 31. The display unit 5 includes a deflection control circuit 501, a video amplifier circuit 502 and a color CRT 503.

Figure 3:
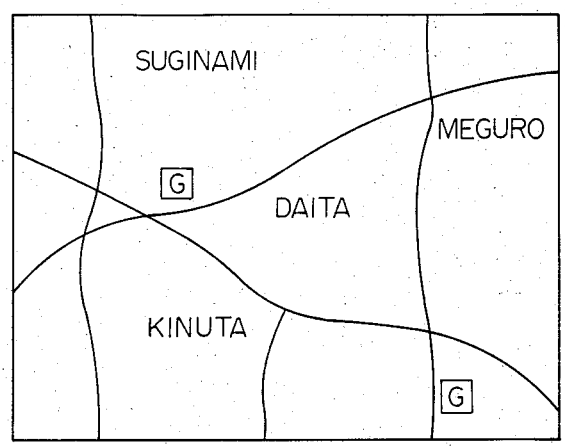
FIG. 3 shows an example of a map displayed on the display unit.
Figure 4:
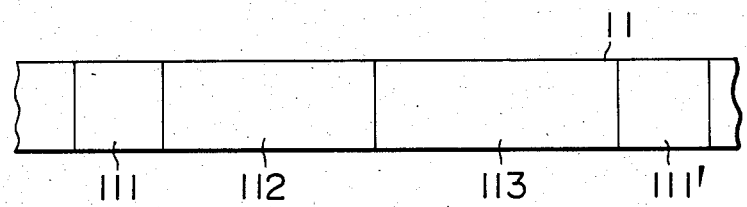
FIG. 4 shows one form of a map data format recorded on a magnetic tape.

A map as shown in FIG. 3 is displayed on the color CRT 503 of the display unit 5 in the navigation apparatus having the structure above described. For this purpose, map data, such as character data and symbol data, as shown in FIG. 3 is recorded, together with map data of road maps, on a recording medium such as a magnetic tape 11 as shown in FIG. 4. Referring to FIG. 4, the magnetic tape 11 includes a map number record section 111, a character/symbol information record section 112 and a road map information record section 113 provided by dividing the area according to the contents to be recorded.

Figure 5:
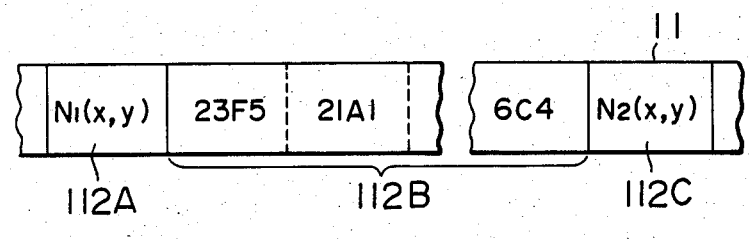
FIG. 5 shows an example of the data format including character data and symbol data recorded on the magnetic tape shown in FIG. 4.
Figure 8:
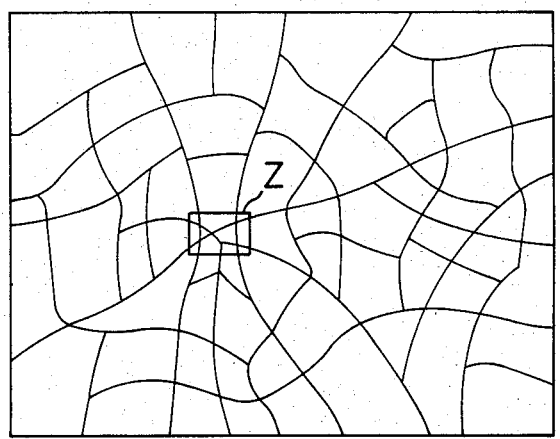
FIG. 8 shows an example of a map of a reduced scale of 1/250,000 ordinarily displayed on the display unit.

The character/symbol information record section 112 will be first described. The data format of the character/symbol information record section 112 is as shown in FIG. 5. Referring to FIG. 5, the position of a character on a main small-scale map (which is ordinarily displayed and is a map of a reduced scale of 1/250,000 as shown in FIG. 8 in the present embodiment) is recorded at the head of the stored character data as a position information part 112A indicating the character position on the X−Y coordinate system of the main small-scale map shown in FIG. 8. This position information part 112A is followed by a character information record part 112B recording dot position information of the characters or symbols as in the case of an output of a character generator. Such character/symbol information recorded on a recording medium is called font information. Character/symbol data read out from the magnetic tape 11 in the cassette tape recorder 4 as a result of searching of the desired map number is written in predetermined locations corresponding to the data position information in the video RAM 324. This manner of data storage is advantageous in that the size of characters is not altered irrespective of whether a displayed map is of an enlarged scale or of a reduced scale. Further, when the same number of characters is displayed always on a map of an enlarged scale or of a reduced scale, the characters displayed on a map of a reduced scale are not clearly visually recognizable. Therefore, information indicating whether the characters are displayed on a large-scale map or a small-scale map is recorded on the position information part 112A for each character/symbol information.

The road map information record section 113 will next be described.

Figure 6:
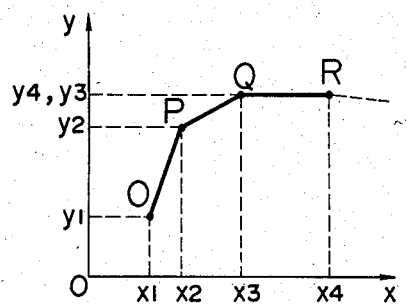
FIG. 6 illustrates the manner of linear interpolation according to the present invention.
Figure 7:
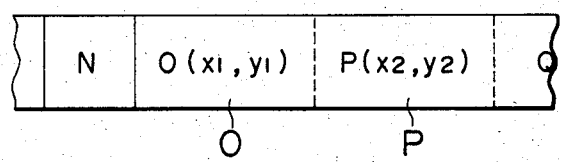
FIG. 7 shows one form of a road map data format recorded on the magnetic tape.

FIG. 6 illustrates the manner of linear interpolation according to the present invention, and FIG. 7 shows the recorded state of the position coordinate information of points O, P, Q and R shown in FIG. 6. The desired map number N is initially searched on the magnetic tape 11 in the cassette tape recorder 4, and the position coordinate information of the points O, P, Q and R on the road map are then read out. More precisely, the position coordinate information $(x_1, y_1)$ of the point O is first read out, and, then, the position coordinate information of the other points are read out sequentially in the order of $P(x_2, y_2)$, $Q(x_3, y_3)$, $R(x_4, y_4)$, . . . Subsequently, linear interpolation is applied to the divided points in the order of the position coordinate information read out from the magnetic tape 11 to draw a road map O - P - Q - R as shown in FIG. 6. It will be seen from FIG. 6 that the number of position informations required for drawing the road map O - P - Q - R is only four(4), in this case. Thus, by the utilization of the technique of linear interpolation, the number of data required for displaying a road on a map can be greatly decreased.

Figure 10:
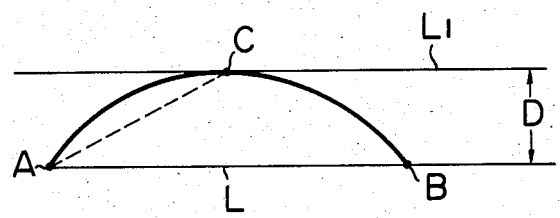
FIG. 10 illustrates the principle of determination of division points for displaying the map shown in FIG. 9, by the linear interpolation.

FIG. 10 illustrates how to determine points dividing a road into sections that can be linearly interpolated by the above manner of linear interpolation.

In FIG. 10, an arc ACB designates a portion of a road map. The point A on this road map portion is selected as a datum point, and the point B is slided along the road map portion. Assume a line $L_1$ parallel to and spaced apart by a distance D from the chord AB (a straight line L) connecting between the points A and B. Then, with the sliding of the point B, the road map portion (the arc ACB) intersects the line $L_1$ parallel to the line L. This intersection C is determined to be a point dividing the road map portion into sections that can be linearly interpolated. Thus, the straight broken line AC connecting the datum point A to the division point C represents a road map portion provided by the linear interpolation. Sequential repetition of the similar procedure determines division points dividing the road map into sections that can be linearly interpolated. The accuracy of a map made by the above method is dependent upon the distance D between the chord AB (the straight line L) and the line $L_1$ parallel to the line L. Besides the method above described, the radius of curvature of a road may be utilized for determination of such division points. The manner of linear interpolation will be described in further detail with reference to FIG. 9.

Figure 9:
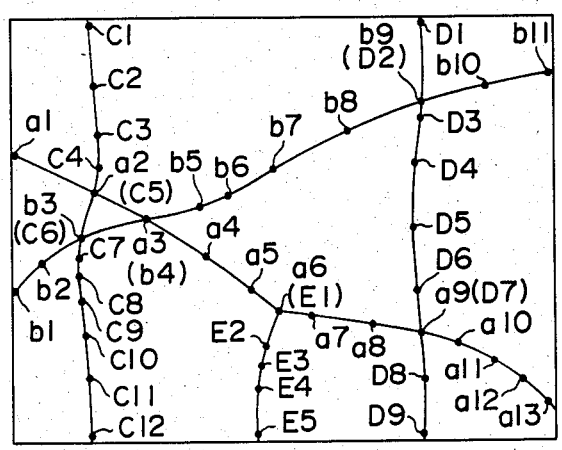
FIG. 9 shows an example of a map displaying, in an enlarged scale, a portion of the map of FIG. 8 by the technique of linear interpolation.

FIG. 9 illustrates how a road map as shown in FIG. 3 is provided by the above manner of the linear interpolation. Data of position coordinates $a_1$ to $a_{13}$ are first sequentially read out from the magnetic tape 11 in the cassette tape recorder 4, and the sections between these position coordinates are drawn respectively by the technique of linear interpolation. Data of position coordinates $b_1$ to $b_{11}$ are then sequentially read out from the magnetic tape, and so on, until data of position coordinates $E_1$ to $E_5$ are finally sequentially read out from the magnetic tape. The sections between those position coordinates are similarly drawn by the technique of linear interpolation to obtain a road map as shown in FIG. 9.

When the road map shown in FIG. 3 is recorded as an assembly of display dots according to the prior art, position coordinate information for as many as about 350 must be recorded to provide display dots required for the map display. In contrast, according to the present invention which stores position coordinate information of division points dividing a road into sections that can be linearly interpolated, the number of required position coordinate information is only 44 as will be apparent from FIG. 9, and yet the road map shown in FIG. 9 ensures the visual recognizability of map information comparable with that of FIG. 3.

According to the illustrated embodiment of the present invention, therefore, the storage capacity required for a road map can be greatly decreased, and the access time for reading out map data can also be shortened.

Although, in the above description, characters and symbols are recorded in the form of font information and position coordinate information of division points dividing a road map into linearly interpolatable sections are recorded, characters and symbols may also be recorded as position coordinate information of division points of linearly interpolatable sections.

The aforementioned navigation apparatus embodying the present invention enlarges and reduces the scale of a map using recorded map data. The operation of the navigation apparatus of the present invention will now be described.

Referring to FIG. 2, recorded map data is read out from a magnetic tape in the cassette tape recorder 4 as described hereinbefore. Road map information read out after reading-out of character/symbol information is written in the RAM 322. The position coordinate information in the road map information written in the RAM 322 are then linearly interpolated in the microprocessor 32 to be written at predetermined locations in the video RAM 324 as an assembly of lines. The map data written in the video RAM 324 in the manner above described is controlled by the video display generator 325 to be displayed on the display unit 5 as a road map as shown in FIG. 8 in which characters and symbols are not shown.

When an enlargement of a portion, for example, a region Z of the road map shown in FIG. 8 with a magnification of, for example, 10 is desired, the region Z and magnification are instructed from the input unit 6. As a method for instructing the region Z, the cursor is fixed at a point on the display screen so as to enlarge the corresponding portion of the map around that point. The map data included in the range of the instructed region Z is selectively read out from the magnetic tape 11. The position coordinates of the map data written in the RAM 322 are enlarged with the instructed magnification, and, in a manner similar to that above described, the character/symbol information is written in the video RAM 324 to be then displayed on the display unit 5 by the video display generator 325. When the original road information or the map data of the map of FIG. 9 which is least of all in the rate of reduction are recorded with the accuracy permitting sufficient display of a road map by linear interpolation, a map of a scale having a larger rate of reduction can be easily displayed with high accuracy.

In the aforementioned embodiment, map data of a map portion to be enlarged is read out from the magnetic tape 11 again when it is desired to display an enlarged map. As another method for displaying an enlarged map, the original road information is written in the RAM 322 with the accuracy permitting an enlarged display so that the magnetic tape 11 need not be retrieved again. In this case, the map data of the map portion to be displayed in an enlarged scale can be selected from among the original road information written in the RAM 322 and can then be directly displayed. Such a modification is advantageous in that any desired map portion can be instantaneously enlarged, and the delay time or access time for retrieval for the purpose of displaying an enlarged map can be eliminated.

In such an embodiment, the function of linear interpolation is provided in the microprocessor 32. However, a unit for effecting the linear interpolation may be provided separately from the microprocessor 32, or the video display generator 325 may have that function.

It will be understood from the foregoing detailed description of the present invention that the storage capacity required for the storage of map data can be decreased, and a large-scale map can be displayed without increasing the storage capacity, thereby further improving the utilizability and utility of the navigation apparatus.

What is claimed:

1. A navigation apparatus for an automotive vehicle, comprising: sensor means for sensing the travelled distance of a vehicle, sensor means for sensing the advancing direction of the vehicle, information storage means for storing map data, signal processor means for computing the present position of the vehicle on the basis of the output signals from said travelled distance sensor means and said advancing direction sensor means and for generating a display signal including the data of the computed present position of the vehicle and the map data corresponding to said vehicle's present position as read out from said information storage means, and display means for displaying said dispaly signal, wherein said map data is stored in the form of position coordinate information of division points dividing roads on the road map into sections that can be approximated by linear interpolation between division points, and wherein said signal processor means comprises means for effecting linear interpolation of said map data stored in said information storage means in the form of said position coordinate information of division points to generate said display signal.

2. A navigation apparatus as claimed in claim 1, wherein said amp data is divided into road map information and character/symbol information, said road map information and said character/symbol information being separately stored in said information storage means.

3. A navigation apparatus as claimed in claim 2, wherein said character/symbol information is font information including position coordinate information corresponding to the road map information.

4. A navigation apparatus as claimed in claim 1, wherein said map data is recorded on a cassette tape.

5. A navigation apparatus as claimed in claim 1, wherein map data required for a map display having a rate of reduction larger than that of a predetermined small-scale map is stored in said information storage means so that a map of any one of a plurality of predetermined reduced scales can be displayed.

* * * * *